Feb. 19, 1929.

W. L. THAETE 1,702,581

CUT-OFF ATTACHMENT FOR FAUCETS

Filed May 3, 1926

INVENTOR.
W. L. Thaete.
BY
ATTORNEY.

Patented Feb. 19, 1929.

1,702,581

UNITED STATES PATENT OFFICE.

WILLIAM L. THAETE, OF DENVER, COLORADO, ASSIGNOR TO THAETE AUTOMATIC VALVE CORPORATION, OF DENVER, COLORADO.

CUT-OFF ATTACHMENT FOR FAUCETS.

Application filed May 3, 1926. Serial No. 106,459.

This invention relates to improvements in cut-off attachments for faucets and its principal object is to provide a device of simple construction which when inserted in the inlet conduit of a faucet of standard make, will automatically shut off the flow of water to the outlet of the faucet in case, for the purpose of repair, the faucet valve is removed.

The present improvements consist for particularly in the construction of the movable part of the attachment, it being a further object of the invention to simplify said part so as to minimize the cost of production without sacrifice of any of the advantages of the device.

Another aim of the invention resides in the provision of means to prevent the rotary movement of the cut-off valve separate from the faucet valve when the latter occupies its operative position.

Figure 11:
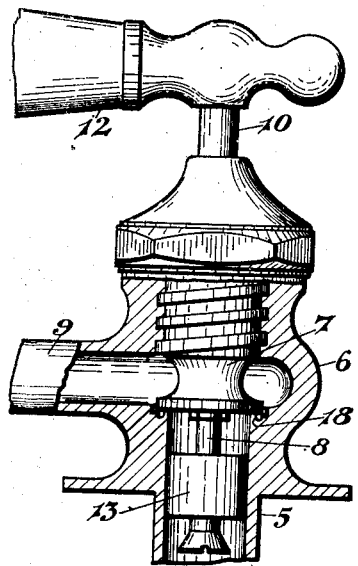
Figure 12:
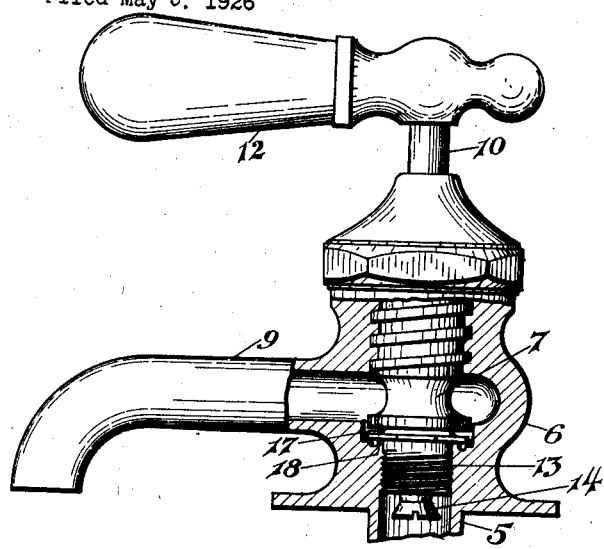
Figure 7:
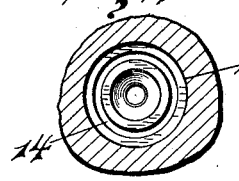
Figure 6:
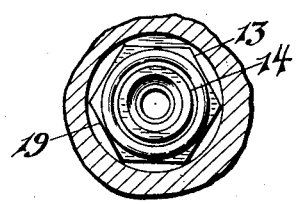
Figure 5:
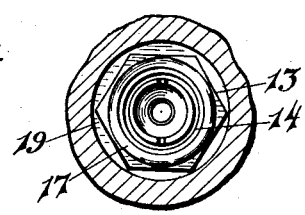
Figure 3:
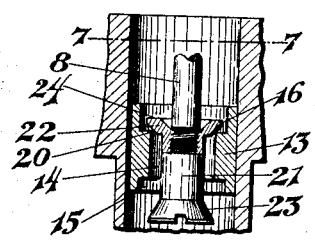
Figures 1, 2:
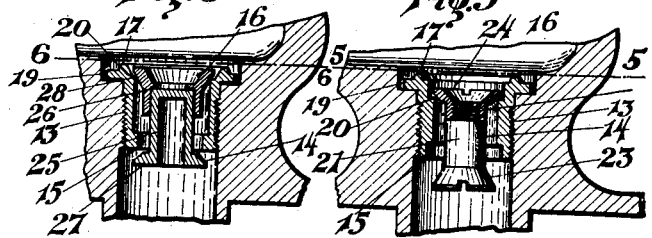
Figure 4:
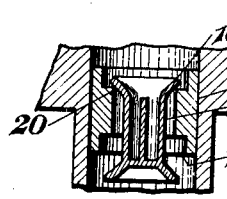
Figure 8:
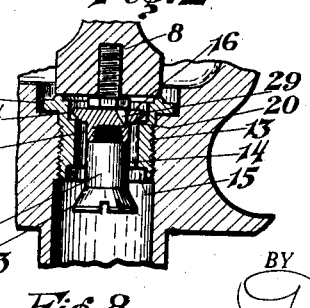
Figures 9, 10:

In the accompanying drawings, in the several views of which like parts are similarly designated, Figures 1, 2, 3 and 4, represent fragmentary sections of the inlet-conduit of a faucet showing the cut-off attachment in different forms, Figures 5, 6 and 7, sections along the lines 5—5 in Figure 1, 6—6 in Figure 2 and 7—7 in Figure 3, respectively, Figure 8, a sectional view similar to Figure 1, showing means to prevent rotation of the cut-off valve relative to the faucet valve, Figures 9 and 10, an elevation and an end view of the bolt in which said means are embodied, drawn to a larger scale, Figure 11, a sectional elevation of a faucet equipped with an attachment of the type shown in Figures 3 and 4, and Figure 12, a sectional elevation of a faucet showing the operative position of the cut off attachment of the constructions illustrated in Figures 1, 2 and 8.

The cut-off attachment comprises a bushing or housing 13, adapted for insertion in the inlet pipe of a faucet of standard construction and a valve 14, movably supported in the bushing to engage with a seat formed at an end thereof.

The attachment is positioned in the inlet pipe 5, of the faucet 6, so that as long as the faucet valve 7, is in its operative position in the housing for the same, a stud or bolt 8, projecting from the faucet valve, will engage the movable valve-member of the attachment to hold it away from its seat and thereby permit of the water flowing from the inlet pipe 5, to the outlet 9, of the faucet when the faucet valve is opened by rotation of its stem 10, through the medium of the handle 12.

In all of the forms of the attachment shown in the drawings, the bushing 13, has at one end a seat 15, to be engaged by the cut-off valve when released by the stud or bolt on the faucet valve when the latter is removed from its housing, and the cut-off valve has at its opposite end an enlargement 16, to engage with the bushing for the purpose of limiting its movement away from the seat.

The forms shown on Figures 1, 2, 8 and 12, have an external screw thread for their attachment to the valve-housing and are thereby distinguished from the forms shown in Figures 3, 4 and 11, in which the bushings are exteriorly smooth and are forcibly driven into the inlet pipe of the faucet to be held in position by frictional contact with the wall thereof.

The forms illustrated in Figures 1, 2, 8 and 12, are further distinguished from the others by the provision of a valve-seat 17, at the end of the bushing opposite to that having the seat for the cut-off valve, which in practice covers and takes the place of the valve-seat 18 on the housing which cooperates with the faucet-valve to obstruct the flow of water to the outlet.

Referring first to Figures 1, 2 and 8, the bushing has at one end the before mentioned seat 15, to be engaged by the cut-off valve, and at its opposite end a flange 19, of hexagonal form for the application of a wrench. The bushing has an external screw thread cooperating with a corresponding thread in the end of the inlet pipe of the valve housing, and the flange has a circular ridge which in practice provides the seat 17, for the valve of the faucet.

The bushing has, furthermore, at its flanged end an interior shoulder 20, for the support of the cut-off valve. In the form of the invention illustrated in Figures 1, 3 and 8, the cut-off valve is composed of two parts, 21 and 22, provided respectively with a male screw thread and a female screw thread for their connection in axial alignment.

The parts 21 and 22, have beveled heads 23 and 24, which in practice engage respectively with the seat 15, and with the shoulder 20, of the bushing, and the heads are kerfed for the application of screw-drivers.

The form illustrated in Figures 2 and 6, differs from those hereinbefore described, in that the two parts 25 and 26, of the cut-off valve are driven one within the other, and held together by frictional contact. One of the parts has, to this end, a smooth socket into which the end portion of the other part is tightly fitted.

The heads 27 and 28, of the two parts may be notched for the application of tools, it being a distinctive feature of the valves so far described that they may be installled in the bushings or removed from the bushings while the latter are in place on the faucet.

The cut-off valve illustrated in Figure 4, differs from the others in that it is made in one piece, the head at its end cooperating with the shoulder 20, of the bushing, having been formed by swaging the hollow end thereof.

In all of the described constructions the cut-off valves are hollow at their ends to admit a stud 8, on the faucet-valve, which in practice holds them away from their seats on the bushings. This stud is usually found in faucets of conventional construction, to secure the leather or rubber washer that engages the valve-seat; but in case the stud is not of sufficient length to perform its function of separating the cut-off valve from its seat, another longer one is readily installed in the place thereof.

In Figures 8, 9 and 10 of the drawings, a stud in the form of a bolt is shown having at its end a tapering segmental prong 29, adapted to enter a correspondingly formed recess in the otherwise solid head of the cut-off valve, the recess being to one side of the center of the head, the principal object of this modification being to prevent the cut-off valve from turning independently.

This segmental prong will obviously prevent independent movements, or rotation of the cut-off valve relative to the faucet valve in two ways, first by a positive engagement between the prong and the recessed portion of the cut-off valve and second, where there is no positive insertion of the prong, by a tilting movement of the valve caused by the prong. That is, if the cut-off valve is in a position with both ends away from the valve seats, an engagement of the prong with the valve will cause same to tilt in the bushing and bind against the sides of the bushing and thereby prevent rotary movement of the cut-off valve.

In the operation of a faucet equipped with the cut-off attachment, the stud or bolt on the faucet valve is in constant engagement with the cut-off valve so as to hold it away from its seat and thereby permit of the unobstructed flow of water between the inlet pipe and the outlet of the faucet when the faucet-valve is opened.

If, however, the faucet-valve is removed, the cut-off valve will be forced to its seat by the water pressure in the service pipe of the water-supply system with which the faucet is connected, and the flow of water to the outlet of the faucet will thus be discontinued until the faucet valve is replaced.

The invention thus makes possible the repairs of faucets such as are frequently required for the replacement of worn washers, without the necessity of shutting off the water supply at the service pipe as would otherwise be essential.

Having thus described my invention, what I claim and desire to secure by Letters Patent is:

1. A cut-off attachment for faucets comprising a bushing adapted to be inserted in the inlet pipe of a faucet, and having a valve-seat and a shoulder at opposite ends, and a valve in the bushing, composed of two connected parts provided with heads to engage with the valve seat and the shoulder respectively.

2. A cut-off attachment for faucets comprising a bushing adapted to be inserted in the inlet pipe of a faucet, and having a valve-seat and a shoulder at opposite ends, and a valve in the bushing, composed of connected male and female parts axially alined and having heads to engage with the valve seat and the shoulder respectively.

3. A cut-off attachment for faucets comprising a bushing adapted to be inserted in the inlet pipe of a faucet, and having a valve-seat and a shoulder at opposite ends, and a valve in the bushing composed of two parts screwed together in axial alinement and provided with heads to engage with the valve seat and the shoulder respectively.

4. A cut-off attachment for faucets comprising a bushing adapted to be inserted in the inlet pipe of a faucet and having a valve-seat and a shoulder at opposite ends, and a valve in the bushing having beveled heads to engage with the valve-seat and the shoulder respectively.

5. The combination with a faucet having an ingress conduit and an egress opening and a valve to regulate the flow of water through the conduit to the opening, of a housing mounted in the ingress conduit, a cut-off valve capable of rotary movement in the housing, and means on the faucet valve adapted to oppose the rotary movement of the cut-off valve by causing it to frictionally engage its housing.

6. The combination with a faucet having ingress and egress conduits and a faucet valve to regulate the flow of liquid through the conduits, of a cut-off valve capable of rotary movement, and centrally offset means on the faucet valve to restrict the rotary movement of the cut-off valve relative to the faucet valve.

7. The combination with a faucet having ingress and egress conduits and a faucet valve to regulate the flow of liquid through the conduits, of a cut-off valve having a centrally offset sloping surface and being capable of rotary movement, and a projection on the faucet valve adapted to restrict the rotary movement of the cut-off valve relative to the faucet valve by engagement with the sloping surface thereof.

8. In a faucet having a main faucet valve, an auxiliary rotatable cut-off valve, and a stud on the main faucet valve having a prong at the end thereof, said prong being disposed at one side of the axis of the stud, and restricting the rotation of the auxiliary valve relative to the main faucet valve, when engaging the auxiliary valve.

9. In a faucet having a main faucet valve, an auxiliary rotatable cut-off valve, and a stud on the main faucet valve having a centrally offset wedge-shaped prong restricting the rotation of the auxiliary valve relative to the main faucet valve, when engaging the auxiliary valve.

10. The combination with a faucet having an ingress conduit and an egress opening and a valve to regulate the flow of water through the conduit to the opening, of a bushing mounted in the ingress conduit, a cut-off valve, capable of rotary movement, in the bushing, and means on the faucet valve to push the cut-off valve away from its seat in the bushing and to prevent its rotary movement relative to the faucet valve.

In testimony whereof, I hereunto affix my signature.

WILLIAM L. THAETE.